United States Patent [19]

Langford

[11] 4,007,889
[45] Feb. 15, 1977

[54] FLOW CAMERA FILM TRANSPORT

[75] Inventor: Forrest L. Langford, Northridge, Calif.

[73] Assignee: Terminal Data Corporation, Woodland Hills, Calif.

[22] Filed: Oct. 9, 1975

[21] Appl. No.: 621,255

[52] U.S. Cl. ............................. 242/199; 352/78 R
[51] Int. Cl.² .................. G03B 1/04; G11B 15/32; G11B 23/04
[58] Field of Search ................ 242/71.2, 197–200, 242/195, 201–208; 352/72–78 C, 157, 158, 159

[56] References Cited

UNITED STATES PATENTS

| | | | |
|---|---|---|---|
| 3,008,661 | 11/1961 | Estes et al. | 242/199 |
| 3,029,032 | 4/1962 | Reed | 242/208 |

Primary Examiner—Leonard D. Christian
Attorney, Agent, or Firm—Harry R. Lubcke

[57] ABSTRACT

A flow camera having film that moves only when an exposure is being made. A three-piece cassette is assembled and coacts with film path rollers for easy threading upon the rotation of a knob. Subsequent rotation of the knob fastens the cassette in place and positions capstan and dancer rollers for defining the operating film path. A double spring determines the egress film tension and a lever-roller combination having mechanical connection to the ingress dancer arm determines the ingress film tension. A fast slow motion is provided by acting upon the mechanical connection between the ingress dancer arm and the ingress film clutch.

10 Claims, 7 Drawing Figures

FLOW CAMERA FILM TRANSPORT

BACKGROUND OF THE INVENTION

This invention pertains to strip film cameras of the flow type.

The prior art, in both flow cameras and tape recording-reproducing apparatus, has invariably employed means to continuously traverse the film or tape involved.

The art has recognized certain requirements for suitably reeling and unreeling the film or tape.

One arrangement has serially employed a spring, cable, compound lever and an axially displacable shaft in a mechanism between a jockey arm idler and an axial-thrust plate clutch.

Another arrangement has included a roller to ride upon the reeled tape, with rotation according to the diameter of the reeled tape causing a bent shaft to exert a corresponding axial pressure upon a clutch through a leaf spring connection.

Still another arrangement has included stiff drives having pinions gears, and torque-drive springs between a differential motor and the two reels for winding and unwinding magnetic tape. A differential motor has rotatable both rotor and stator. The tape drive itself was separately accomplished.

Friction clutches as machine elements have employed coiled axial springs. These have been single, or if double, are separately placed with respect to an intermediate housing. Such "clutches" have frequently provided a power drive through the torsional stress of the springs, rather than to provide an axial force a friction plate clutch.

BRIEF SUMMARY OF THE INVENTION

This flow camera has an intermittently rotated capstan to move non-sprocketed film only when the exposure of a document is to occur.

A three-piece cassette accepts unexposed film upon the spool provided by the film manufacturer, which may be a solid-sided daylight loading type reel. A mirror image second part of the cassette accepts the exposed film. An intervening fitment interlocks the two film-containing parts of the cassette.

A pair of rollers on long arms normally disposed adjacent to the capstan and a pair of rollers on short arms normally adjacent to the egress and ingress parts of the cassette, guide the film for the normal exposure thereof.

However, in order to facilitate placing the cassette with film extending between the two film-containing parts thereof into the camera, a mechanism comprising a shaft, knob, dual crank and rods connecting the crank to the long arms is operable upon the rotation of the knob a half turn, to move these arms significantly away from their operating positions. A mechanical shape relation between the long and the short arms causes the short arms to also significantly move away from their operating positions.

This gives an unobstructed path for the film that extends between the two film-containing parts of the cassette to enter the camera. When this has been accomplished the knob is rotated back a half turn and the arms assume their normal operating positions. The knob itself locks the cassette in the camera by bearing upon the central fitment.

The clutch that is required to pay-out the film with a necessary tension from the egress part of the cassette is tensioned with a double helical-wound spring assembly in which the turns of one spring frictionally mesh with the turns of a mating spring. As used, the spring assembly acts as a single entity. However, the force upon the clutch can be increased or decreased by rotating one spring with respect to the other. This makes the spring as a whole either longer or shorter, as may be desired, thus adjusting the force it exerts within the fixed axial space of the clutch.

At the ingress side of the cassette a yoke having a fulcrum with typically a cable connecting the stem of the yoke to the adjacent short arm for providing axial force upon the yoke corresponding to the degree of tension on the film in normal use, and with rollers to bear upon a rotatable plate of the clutch on the other side of the fulcrum upon the arms of the Y or U shape of the yoke.

A fast slew rate for unwinding the film from the egress side of the cassette to the ingress side is provided by imposing an over-ride of tension on the cable.

The invention accomplishes required precision of performance in a structure that can be inexpensively manufactured.

DESCRIPTION OF THE PREFERRED EMBODIMENTS

Figure 1:
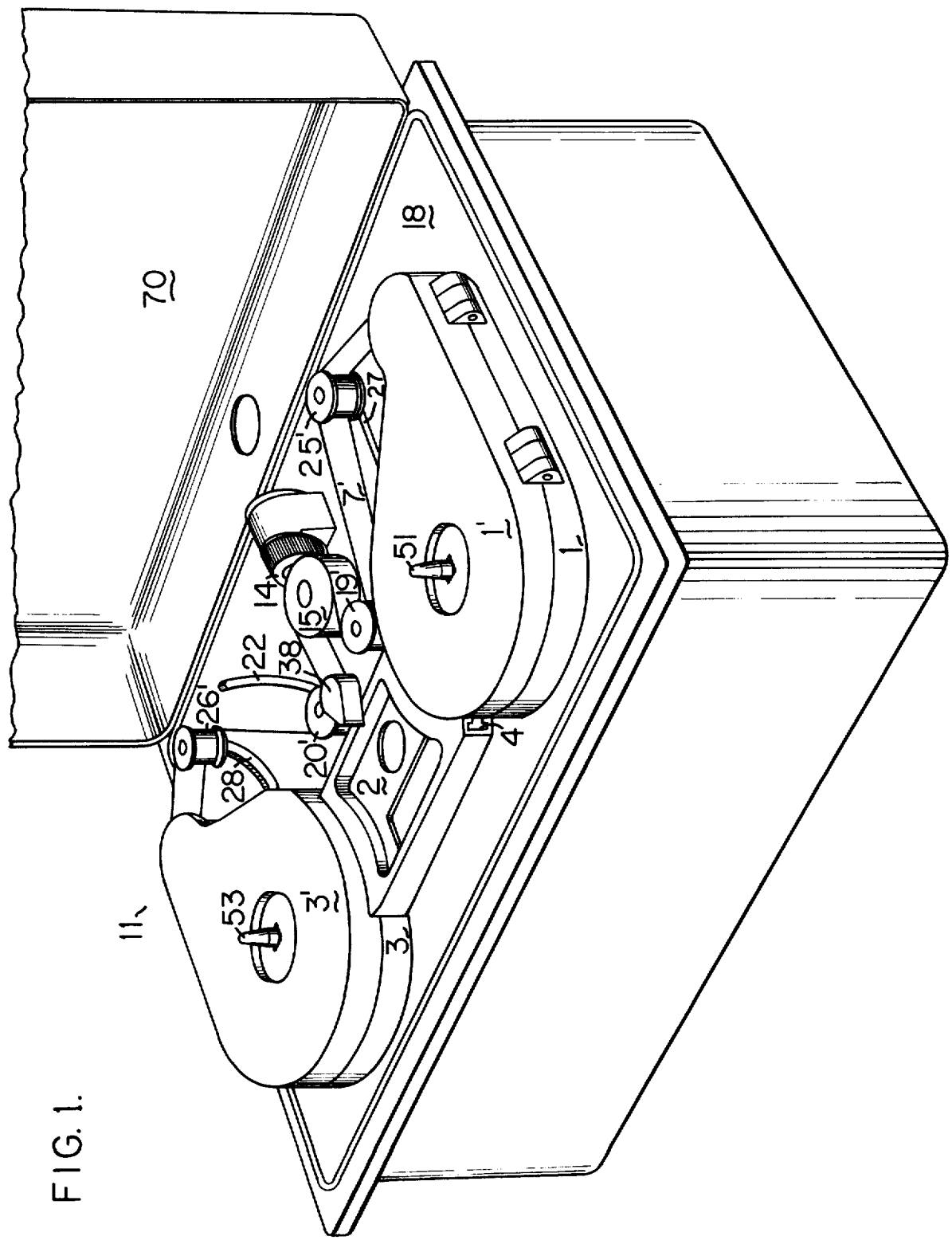
FIG. 1 is a perspective view of the device with the covers in place and the lid raised.
Figure 2:
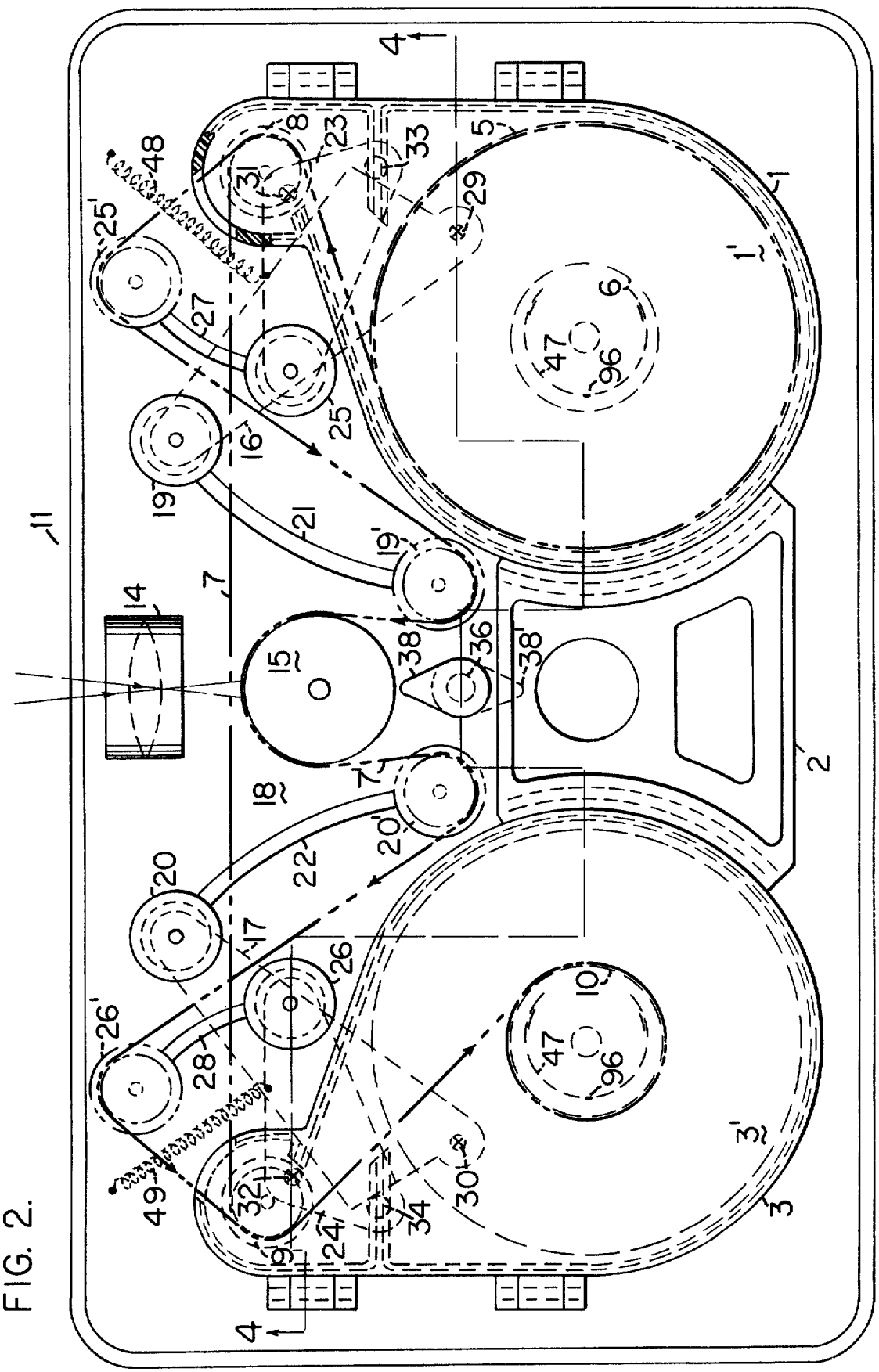
FIG. 2 is a front plane view of the device, showing the cassette and also the film transport paths in heavy dot-dash lines.

In FIGS. 1 and 2, numeral 1 indicates the pay-out or egress portion of the film cassette. This is shown mechanically interlocked with fitment, or handle, 2, and the take-up or ingress portion 3 of the cassette is similarly interlocked on the opposite side of the fitment.

The interlock is accomplished by a T shaped circumferential lip 4 on portion 1 of the cassette, which fits into a corresponding open slot in fitment 2. An equivalent interlock structure fastens ingress portion 3 to fitment 2.

Each portion of the cassette, which may also be termed a magazine, has a cover with a light-tight joint; the covers being identified as 1' and 3'.

In the egress portion a full spool or reel of unexposed film 5 is placed therein in a dark-room, or in subdued light if on a "daylight loading" reel. In either event it remains upon the spool or reel provided by the film manufacturer. This is a convenience made possible by this invention.

A short length of the film itself 7 is withdrawn from the roll. Film roller 8 is within egress portion 1 of the cassette for the proper discharge of the film. The film is passed around that roller, is spread to the ingress portion 3 of the cassette, is passed around a corresponding roller 9, and is attached to a take-up film core or reel 10.

In this condition the assembled cassette is supplied with unexposed film and is ready for insertion in camera 11.

Insertion into the camera involves special placement of the film roller arms away from their operating positions. This is accomplished "automatically" according to this invention by manual rotation of cassette retaining knob 38.

In camera 11 lens 14 images a moving document (not shown in the figures) upon unexposed film 7', which is also moved proportionally at a reduced rate of speed and in the opposite direction to the direction of motion of the document. The image is formed upon the film upon the side of capstan 15 that is nearest to the lens, as the dashed lines indicating the incoming light path reveal. The opposite direction of motion is required because of the known inverting effect of a single lens assembly.

Two long arms 16 and 17 are shown dotted in FIG. 2, because of being under camera baseplate 18. They carry film guide rollers 19 and 20, respectively, the shafts for which pass upward through arcuate slots 21 and 22. See FIGS. 2 and 4. These slots allow these rollers in the downward positions 19' and 20' to wrap the film, there designated as 7', around the capstan.

Two short arms 23 and 24, also shown dotted in the FIG. 2, carry film guide rollers 25 and 26, the shafts for which pass upward through arcuate slots 27 and 28. This allows these rollers in their upward positions 25' and 26', or in an intermediate position, to act as "dancer rollers", to take up slack in the film and thus to always keep it taught.

The left and right sets of long and short arms are mirror-image duplicates of each other.

In order that film 7 may be unobstructively loaded as the cassette is put in place, the long arms must be in an upward position and the short arms in a downward position. When the mechanism is changed to the operating position, this relation of the arms with their rollers is such as to automatically thread the camera.

The shape and placement of the arms and the coation with the mechanism to be described forces each short arm to a fully downward position when each long arm has been moved to a fully upward position by the mechanism.

Both long and short arms are of roughly triangular shape. Long arm 16 is pivoted at pivot 29, and long arm 17 at 30. Short arm 23 is pivoted at pivot 31 and short arm 24 at pivot 32. These pivots are marked with an *x* in FIGS. 2 and 3 for easy identification.

Short arm 23 has a pin 33 at the lower apex of the triangle and short arm 24 has pin 34 similarly placed. Pin 33 rides in contact with the short base of the roughly isoceles-triangle-shaped long arm 16, and pin 34 is similarly disposed with respect to long arm 17.

The relation between the positions of the pivots, the pins, and the shape and attitude of the short bases of the long arms is such that as the long arm is moved upward the companion short arm is forced downward by pin 33 or 34, respectively. Such forcing occurs only when the long arms are moved upward for the insertion of the cassette. When the long arms are in the downward camera-operating position, the companion short arms are free to occupy any positions between full up and full down positions; which positions are shown in dotted in FIG. 2 and inferred by the positions of the four film rollers in FIG. 1.

This novel interaction of the arms is highly useful in threading and operating the camera and the structure is extremely simple and rugged.

Figure 3:
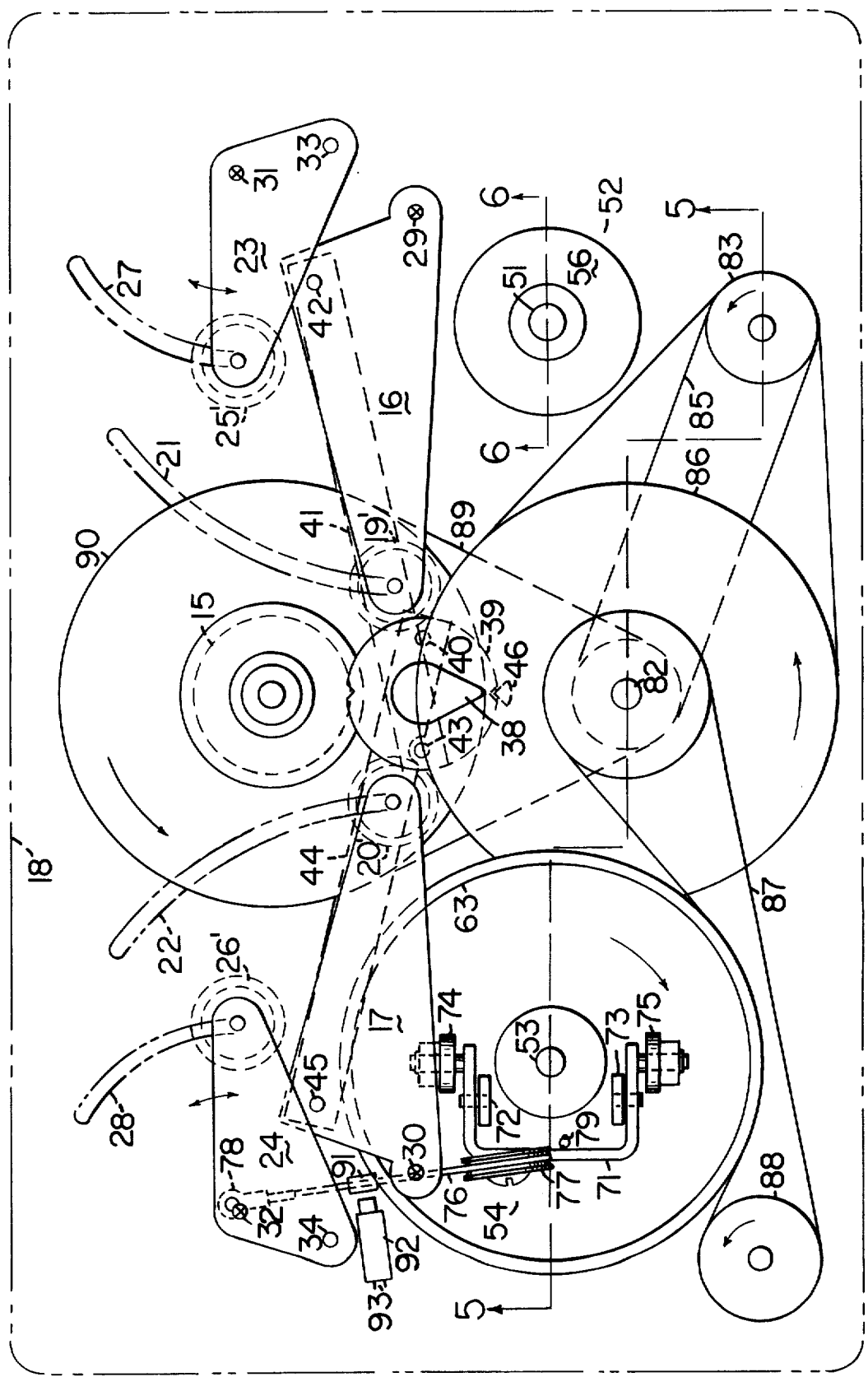
FIG. 3 is also a front plane view, but with the base plate, in effect, removed; as along section line 3—3 in FIG. 4, showing the arms and the belt drives.
Figure 4:
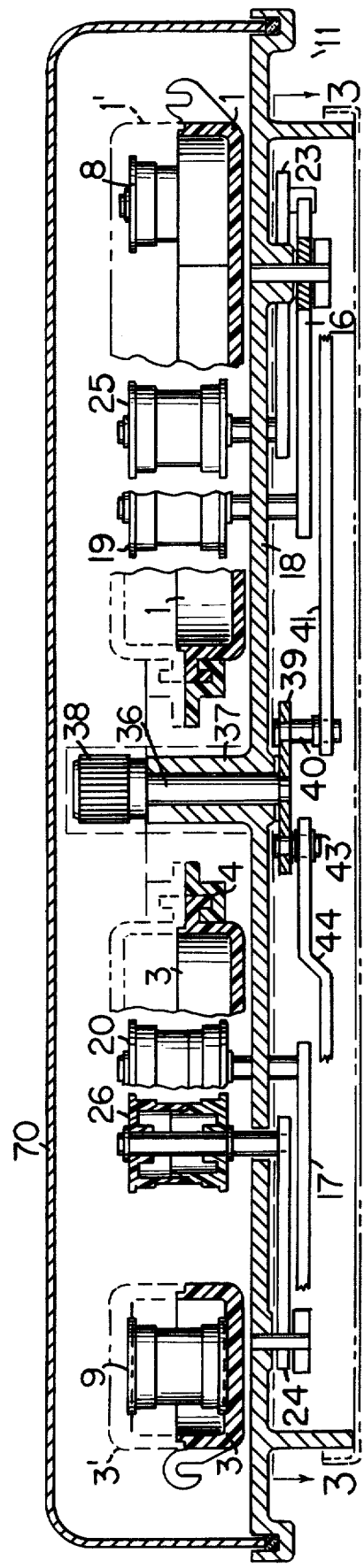
FIG. 4 is an elevation view, sectional along line 4—4 in FIG. 2, showing the arms and the mechanism for the control thereof.

The mechanism for coacting with the insertion of the cassette into the camera and for locking it in place is shown in both FIGS. 2 and 3, as well as generally in FIG. 1, and in part in FIG. 4.

Shaft 36 is centrally located on camera base plate 18 and extends through boss 37 therein. Pointed knob 38, of metal or a strong plastic, such as bakelite, a phenol-formaldehyde, surmounts the shaft and boss upon the operating deck of the upper surface of the base plate at an elevation equal to that of the upper surface of fitment 2. Thus, when the knob is turned to move the pointed portion over the fitment the cassette is held down upon the base plate.

On the bottom of shaft 36 dual crank 39 may have the form of a disk or of an elongated member, with the center thereof attached to the shaft. A long pivot 40 is fastened to a tensile-compressive stress member, or rod, 41, which in turn is attached to pin 42 of long arm 16. This pin is at the upper corner of a short base of the triangle-shaped long arm; see FIG. 3.

An equivalent structure for the other side comprises short pivot 43, rod 44, and pin 45 upon long arm 17. With the disk dual crank detent means 46, resilient, may be employed, coacting with two peripheral notches in the disk to index the "arms-load" and the "arms-run" position. Pins 40 and 43 have different lengths so that a full half-turn can be accomplished by the dual crank member.

The several film rollers, 8 through 26, may be formed of Delrin, an acetal homopolymer available from DuPont, in two nesting halves. This plastic is self-lubricating, so that bearings may be considered as cast-in.

In FIG. 2 knob 38 is shown in the cassette-loading position. This forces the arms away from the straight-across path of film 7 and allows the cassette, fitment and film to enter the camera. When the knob has been rotated a half turn, to the dotted position 38', the mechanism described has brought the four arms to the film operating positions and the pointed part of the knob has mechanically secured the fitment and thus the cassette to base plate 18.

The major part of the film path mechanism operates positively and without springs. However, spring 48, preferably of the coiled tension type, is fastened to short arm 23 and to base plate 18, such as to raise the arm upward and away from the cassette. This provides tension on film 7' when it is in the operating path. An equivalent spring 49 attaches to short arm 24 and to the base plate.

A means operating tension of 280 grams is desirable.

In the sprocketless film drive according to this invention the function of clutches on the supply and takeup magazines is important.

Figure 6:
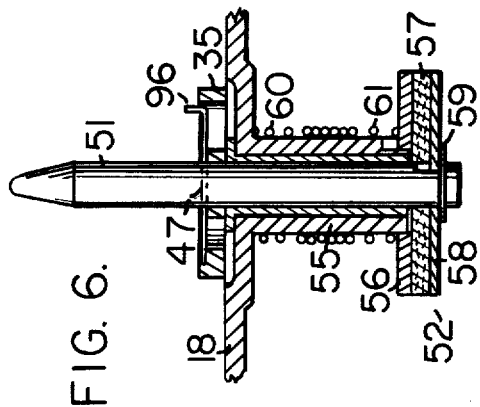
FIG. 6 is a fragmentary elevation view, sectional along line 6—6 in FIG. 3, showing the pay-out or egress clutch.

On egress spindle 51 a normally fixed drag clutch generally identified as 52 is provided. See FIGS. 3 and 6.

On ingress spindle 53 clutch 54 is provided. It has a yoke lever and a connection to short arm 24, whereby the film drive force provided by the clutch is dependent upon the film tension, inversely. See FIGS. 3 and 5.

Clutch 52 includes, in part, boss 55, which is downwardly integral with respect to base plate 18. The bottom extremity thereof has a D shape, upon which drag plate 56 is a sliding fit. This allows the plate to translate axially, but not to rotate.

Next below is friction disk 57. This may be a piece of hard felt having the same diameter as plate 56.

Next below is rotatable drag plate 58. It has a D shaped hole that fits upon a D shaped end of shaft 51. Plate 58 is constrained as to axial movement by gripping washer 59. The function of the D structure on plate 58 is rotational driving. When shaft 51 rotates plate 58 also positively rotates the same amount.

How great the frictional drag of the clutch shall be is determined by the resulting unified combination of springs 60 and 61. These are coiled helical springs having the same diameter, the diameter being such that a free sliding fit is obtained longitudinally along boss 55.

The winding pitch of each spring is equal to the diameter of the spring wire of each spring, typically 1.5 mm. Thus, the two springs act as one spring, insofar as axial force upon drag plate 56 and the bottom of base plate 18 are concerned. In adjusting this force to initially set up the machine it will be realized that if the two springs are mutually "threaded" out of each other the resulting spring will be longer and the force will be greater. The converse is also true.

This adjustment is made by hand. The mutual friction between springs is sufficient to retain any given adjustment, it has been found. Additionally, a spot of glyptal cement or the equivalent can be painted upon the mutual portion of the spring structure and this will retain any given adjustment until this is purposely altered by removing the cement and changing the mutuality.

Normally, variable-pressure clutch 54 is driven by the prime mover of the transport system by means of pulley 63, which receives a drive by means to be later disclosed. This drive is about 20 to 25% faster than is normally required to revolve the spool or reel of the ingress magazine so that there will always be a torque to take up the film, even at the smallest diameter of the film upon the central core.

Pulley 63 is rotated at all times when the camera is "on", whether or not capstan 15 is rotating to take a flow camera type of exposure. The pulley is typically molded of a plastic, such as Nylon, a synthetic polymeric amide, and a flat belt drives around the circumference.

The lower face of the pulley is provided with a disk of hard anodized aluminum, or equivalent, 64 by cementing with an epoxy or an equivalent cement. This gives a hard surface that is suitable for the frictional motion of material 65 thereagainst. This material may be hard felt.

The pulley has an upstanding hub that rotates freely about sleeve 66, which, in turn, is secured to a downwardly extending boss 67 of base plate 18. The pulley has axial freedom over a limited distance.

Lower clutch plate 68 presents a similar hard surface to material 65. It is rigidly fastened to take up spindle 53 by setscrew 69, or equivalent.

In FIG. 3 the plan view of this assembly, taken from just above the pulley, shows the yoke employed to exert desired pressure upon the pulley in an axially downward direction to provide functioning of the clutch.

Yoke 71 has a U shape and is supported by fulcrum pivots 72 and 73, which extend upward to the lower side of base plate 18 for support. At the extremities of the U are rollers 74 and 75, which are retained on axles fastened outwardly from the U.

Cable 76 is attached to the center of the bottom of the U and passes over grooved pulley 77 to effect a right-angle change of direction so that the opposite end can be fastened to eccentric 78, that is rigidly attached to pivot 32, which turns with short arm 24.

As this short arm moves upward, signifying reduced tension in film 7' and a build-up of "slack" film in the vicinity of that short arm, eccentric 78 revolves slightly and raises the bottom side of the U by increased tension on cable 76. This lowers rollers 74 and 75, thus increasing the pressure on frictional material 65 and resulting in a greater torque to turn spindle 53 faster.

A tension type coiled spring 79 extends from the bottom of the U to the under side of base plate 18. This provides an initial constant tension on the yoke and is adjusted in the force that it exerts, along with the other springs in the system, so that normal motion and tension on film 7' is maintained.

Figure 5:
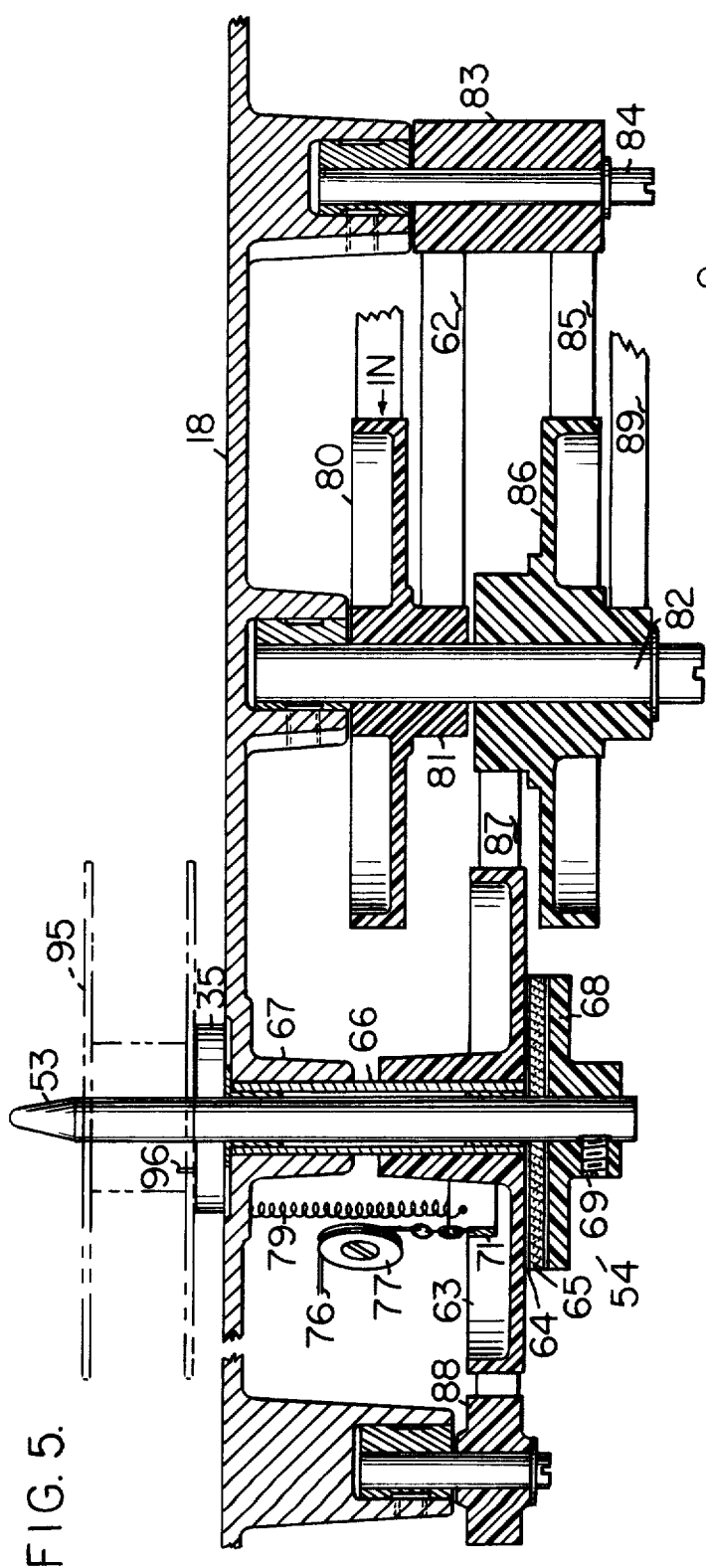
FIG. 5 is an elevation view, sectional along lines 5—5 in FIG. 3, showing the ingress clutch and the belt drives.

The prime mover drive to actuate the camera transport is impressed upon free-running pulley 80; see FIG. 5. This is from a belt that also powers the document translating transport. (Not shown.) With such a common power configuration the film is certain to move synchronously with the documents. Typically a synchronous motor (not shown) is the prime mover for the system here described. In this way other synchronous motors may be employed to handle the documents before and/or after photographing by this camera system.

Pulley 80 is compound, having also a smaller portion 81, typically of one-fourth the diameter of pulley 80. These run upon a stationary dowel pin shaft 82, which is fastened to the under side of base plate 18. A typical diameter for pulley 80 is 8.7 cm, with a face for handling a belt 0.8 cm wide.

Such a belt, 62, passes from portion 81 to idler pulley 83. This is also run upon a stationary shaft, 84. From there another belt 85 passes from the idler pulley to three-step pulley 86, upon the largest diameter thereof, which gives another speed reduction of four-to-one.

From the top portion of pulley 86, of intermediate diameter, belt 87 passes around change-of-direction idler pulley 88 and then makes a partial wrap around pulley 63, which forms one part of clutch 54. This arrangement wraps the emulsion side inwardly of the film, which is desired in this application of this device.

Belt 89, passing from the lowest and smallest portion of pulley 86 wraps around capstan drive pulley 90. See FIG. 3. This is another large pulley, giving approximately a four-to-one reduction in speed and a total reduction of 60 to 1.

The several belts mentioned may be fabricated of Nylon and cotton cords with a neoprene filler between the woven cord structure. Such belts are manufactured by Walters Belting, Inc. of Connecticut. They have a slight elasticity, so that idler pulleys are not required for belt tightening.

In FIG. 5, bushing 66 and those associated with shafts 82 and 84 are shown as eccentric within the bosses of base plate 18. These allow for belt tightening if other types of belts should be used, or if otherwise required.

Capstan 15 is actuated to revolve at synchronous speed in a very small fraction of a second by an electrically energized magnetic clutch, and to similarly stop by an electrically energized brake, both of which are upon the shaft that carries the capstan and below it.

The electrical energization is in the form of a pulse of sufficient duration to accomplish the function required. The energization is supplied from logic that is commanded from sensors that detect the presence of a document in the document transport part (not shown) of an over-all system of which the subject film transport is a part.

Significant saving of film occurs because of this start-stop performance of the capstan over the conventional continuous flow camera.

At times it may be desirable to traverse film 7' rapidly from the egress to ingress portions, or magazines, of the cassette, as when the last part of the film on the reel has not been exposed and will not be exposed at the election of the operator because all of the images desired have already been exposed on the film.

Magnetic sleeve 91 is fastened upon cable 76 and is positioned opposite electromagnet 92, having terminals 93. The assembly is shown in FIG. 3.

The terminals are connected to the electrical control part of the apparatus (not shown), so that the magnet will be energized at will, as by the operator pressing a button marked "slew". This attracts sleeve 91 to the electromagnet and places a significant additional stress upon yoke 71 through cable 76, thereby providing a firm drive to spindle 53 for accomplishing rapid take-up of the film.

In an alternate arrangement the electromagnet can be omitted and the "slew" button non-energizes both the clutch and the brake of capstan 15. Additionally, the mechanical forces acting upon ingress clutch 54 and its frictional capability for driving shaft 53 are fabricated so that a fast slew drive can be accomplished. That is, these are greater than required for the normal take-up function.

Typically, daylight reel 95 is driven by axial spring pin 96 engaging a corresponding hole in the hub of the reel when circumferential identity is accomplished in the initial installation of the reel.

The photographic exposure of film 7' occurs through a relatively narrow optical slit according to flow camera technique.

A light-tight cover 70 surmounts base plate 18 and is removably fastened thereto, as by hinges. See FIGS. 1 and 4.

It is usual to employ 16 mm wide sprocketless photographic film, with both sides of a document being simultaneously imaged on half of the width thereof. After one run-through of the entire length of the film the cassette is withdrawn from the camera and is replaced therein in a turned-over position. A second run-through then doubles the number of exposures upon a single strip of film. Index marks may be provided by suitable exposure of the film along each side, to allow easy retrieval.

An alternate structure for the film port of at least one magazine, as 1,1', or 3,3', is possible and allows a magazine containing exposed film to be discharged to further apparatus, such as a developer-processor machine, without the use of a dark room.

Figure 7:
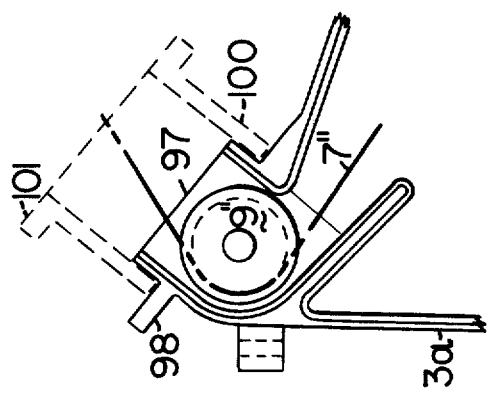
FIG. 7 is a fragmentary view of an alternate configuration for the magazines of the cassette.

The modification of magazine 3 is shown in fragmentary sectional elevation as 3a in FIG. 7. The mold for the plastic material is altered to provide a rectangular (typically square) discharge port 97 for the film 7''. Flange 98 extends around the port to promote rejection of light.

Film roller 9'', the equivalent of roller 9 in FIG. 2, guides the film either in or out of the magazine as required by the operation being performed. When the cassette is in the camera 11 the direction of the film motion would be inward; when the magazine is attached to a processor, the motion is outward.

A rectangular attachment 100 is shown dotted in FIG. 7. This may be provided to receive port 97 in a light-tight relation, and to fasten the same to a processor, either temporarily or permanently. The attachment 100 is provide with a flange 101 for fastening the attachment to a processor or like machine.

If the modification is employed it is usual to provide rectangular film ports for both magazines 1,1' and 3,3'. This allows flexibility in assembling magazines into a cassette and in the mode of operation of the camera. The functioning of the magazines within the camera 11 is the same for either the curved port of FIG. 2, or the rectilinear port of FIG. 7.

The magazine containing the film at the end of the camera operation is, of course, the one that is normally then attached to a processor or other machine.

The axial spring pin previously mentioned may be provided by forming a circumferential undercut within hollow collar 35 and inserting a quasi-circumferential spring 47 therein, having a protruding pin portion 96. See FIGS. 6 and 2.

The free ends of the circumferential spring are each staked in place in the collar to secure the spring to the collar. The pin portion protrudes through a hole in the collar; to ultimately enter a corresponding hole in film reel 5. If the hole in the reel and the pin are not circumferentially aligned, the pin is depressed and the reel revolves a fraction of a revolution with respect to the collar until the pin and the hole in the reel are circumferentially aligned. Then the pin slips into the hole and remains there to drive the reel until it is removed from the magazine.

This is a simple structure for accomplishing this function.

It will be understood that although a preferred structure has been set forth herein, other modifications may be made; as the use of film of 35 mm or other width, the belts may be of toothed construction, the cassette may be formed of only one piece, and the relative size and shape of the elements may be modified to a certain degree.

I claim:
1. An intermittently operable flow camera film transport system, comprising;
   a. a film cassette (1, 2, 3) for enclosing both extremities of a strip of film (7),
   b. an intermittently operable capstan (15) to drive said film only when the exposure of a document thereon is to occur,
   c. two pairs of members positioned on opposite sides of said capstan, with a member of each pair on opposite sides of said strip of film, to guide the film from said cassette (1) to said capstan and from said capstan back to said cassette (3),
   d. a mechanism (36–44) attached to and controlling said members to move the members of each pair oppositely away from the path of said film from said cassette to said capstan and from said capstan to said cassette (7')

to allow said cassette with said film (7) to be removably installed into said camera, and e. plural clutch means (52, 54) upon said transport system to control the egress and ingress of said film from said cassette.

2. The transport system of claim 1 in which said cassette comprises;
   a. an egress magazine (1,1'),
   b. an ingress magazine (3,3'), and
   c. a fitment (2), removably engaging both of the recited magazines to assemble the whole into a cassette.

3. The transport system of claim 1, in which said members comprise;
   a. two pivoted long arms (16,17) positioned to guide said film adjacent to said capstan, and
   b. two pivoted short arms (23,24) separate from said long arms positioned to guide said film adjacent to said cassette.

4. The transport system of claim 3 in which said mechanism comprises;
   a. a shift (36) having a knob (38) and a dual crank (39), and
   b. a rod (41,44) connected between said dual crank and each of said long arms to position said long arms.

5. The transport system of claim 3 in which said mechanism comprises;
   a. a shaft (36) having a knob (38),
   b. said knob (38) being formed and positioned to;
      a. allow said cassette (1,2,3) to be inserted or withdrawn from said transport system with said arms being moved away from the operating path of said film when said knob is in a first position, and
      b. to fasten said cassette in said transport system and to release said arms to guide said film adjacent to said capstan and to said cassette in the operating path of said film when said knob is in a second position.

6. In a film cassette transport system plural clutch means comprising;

a. a first clutch (52) having a coiled axially adjustable spring (60,61)
   to control the egress of said film from said cassette, and
b. an arm (24) adjacent to said cassette,
c. a second clutch (54) having pressure means (71,74,75) controlled by the position of said arm (24) that is adjacent to the ingress (3) part of said cassette
   to control the ingress of said film into said cassette for maintaining tension upon said film (7').

7. The transport system of claim 6 in which said second clutch comprises;
   a. a yoke (71) having a fulcrum (72,73),
   b. an eccentric (78) attached to the arm (24) that is adjacent to the ingress magazine (3) of said cassette,
   c. means to mechanically connect (76) said yoke to said eccentric at one side of said fulcrum, and
   d. rotatable means (74,75) to bear upon said second clutch at the other side of said fulcrum to pressurize said second clutch for driving said film.

8. The transport system of claim 7 which additionally includes for a fast slew motion of said film;
   a. auxiliary means (91–93) to exert a larger than normal magnitude of force upon said means to mechanically connect (76) said yoke,
   to fully pressurize said second clutch.

9. The transport system of claim 2, in which;
   a. at least one of said magazines has a roller (9') and a
   rectilinear film port forming a light tunnel, suited for light-excluding mechanical attachment to other apparatus apart from said transport system.

10. The transport system of claim 1, in which a said camera additionally includes;
    a. a hollow collar (35), and
    b. an axial spring pin formed of a circumferential portion (47) nested within said collar
    and a pin portion (96) extending axially through said collar to engage a film reel.

* * * * *